(12) United States Patent
McGrory et al.

(10) Patent No.: US 11,845,444 B2
(45) Date of Patent: Dec. 19, 2023

(54) SYSTEM AND METHOD FOR PERFORMING ADVANCED DRIVER-ASSISTANCE FUNCTIONS INCLUDING ADAPTIVELY ACCOUNTING FOR IMPACT OF DIFFERENT PAYLOAD OR TRAILER CONFIGURATIONS

(71) Applicant: GM GLOBAL TECHNOLOGY OPERATIONS LLC, Detroit, MI (US)

(72) Inventors: Jackson Barry McGrory, Mississauga (CA); Klaus Trangbaek, Ein Vered (IL); Zhi Li, Unionville (CA); Mohammadali Shahriari, Markham (CA); Patrick Giancarlo Gabriel Digioacchino, Niagara Falls (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 45 days.

(21) Appl. No.: 17/464,145

(22) Filed: Sep. 1, 2021

(65) Prior Publication Data
US 2023/0064300 A1    Mar. 2, 2023

(51) Int. Cl.
| | | |
|---|---|---|
| *B60W 40/10* | (2012.01) | |
| *B60W 30/02* | (2012.01) | |
| *B60W 40/13* | (2012.01) | |

(52) U.S. Cl.
CPC ......... *B60W 40/10* (2013.01); *B60W 30/02* (2013.01); *B60W 40/13* (2013.01); *B60W 2520/125* (2013.01); *B60W 2520/14* (2013.01); *B60W 2552/15* (2020.02)

(58) Field of Classification Search
CPC ...... B60W 40/10; B60W 30/02; B60W 40/13; B60W 2520/125; B60W 2520/14; B60W 2552/15
See application file for complete search history.

(56) References Cited

U.S. PATENT DOCUMENTS

| | | | | |
|---|---|---|---|---|
| 5,558,350 A | * | 9/1996 | Kimbrough | B62D 13/04 280/426 |
| 6,604,035 B1 | * | 8/2003 | Wetzel | B60T 8/1708 701/72 |
| 7,561,953 B2 | * | 7/2009 | Yu | B62D 6/002 280/400 |
| 10,612,961 B2 | | 4/2020 | Huang | |

(Continued)

*Primary Examiner* — Nicholas Kiswanto
*Assistant Examiner* — Madison B Emmett

(57) ABSTRACT

A vehicle parameter estimation module is configured to generate a first estimate of a vehicle parameter based on operating conditions of a vehicle measured or estimated at a first time. The vehicle parameter includes at least one of a tire cornering stiffness of the vehicle and an understeer coefficient of the vehicle. The vehicle parameter estimation module is also configured to determine an error value based on the first estimate of the vehicle parameter and values of the vehicle operating conditions measured or estimated at a second time that is later than the first time. The vehicle parameter estimation module is further configured to generate a second estimate of the vehicle parameter based on the first estimate of the vehicle parameter and the error value. A vehicle actuator control module is configured to control an actuator of the vehicle based on the second estimate of the vehicle parameter.

20 Claims, 4 Drawing Sheets

(56) References Cited

U.S. PATENT DOCUMENTS

| | | | |
|---|---|---|---|
| 2003/0045980 A1* | 3/2003 | Boswell | B62D 6/00 |
| | | | 701/41 |
| 2004/0102887 A1* | 5/2004 | Lin | B62D 7/159 |
| | | | 701/41 |
| 2005/0216164 A1* | 9/2005 | Sakata | B60T 8/1755 |
| | | | 340/440 |
| 2021/0362730 A1* | 11/2021 | Dix | G07C 5/0808 |
| 2022/0306117 A1* | 9/2022 | Laine | B60T 8/1725 |

* cited by examiner

SYSTEM AND METHOD FOR PERFORMING ADVANCED DRIVER-ASSISTANCE FUNCTIONS INCLUDING ADAPTIVELY ACCOUNTING FOR IMPACT OF DIFFERENT PAYLOAD OR TRAILER CONFIGURATIONS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for performing advanced-driver assistance functions including adaptively accounting for impact of different payload or trailer configurations.

Most modern vehicle control systems perform advanced driver-assistance systems (ADAS) functions such as adaptive cruise control, electronic stability control, lane keep assist, and lane centering control. When performing adaptive cruise control, a vehicle control system maintains the speed of a vehicle at a set speed and maintains a set distance between the vehicle and another vehicle ahead of the vehicle. When performing electronic stability control, a vehicle control system lessens the speed of a vehicle and applies one or more brakes of the vehicle to prevent understeer and oversteer. When performing lane centering control, a vehicle control system steers a vehicle to keep a vehicle centered in a lane.

SUMMARY

A first example of a system according to the present disclosure includes a vehicle parameter estimation module and a vehicle actuator control module. The vehicle parameter estimation module is configured to generate a first estimate of a vehicle parameter based on operating conditions of a vehicle measured or estimated at a first time. The vehicle parameter includes at least one of a tire cornering stiffness of the vehicle and an understeer coefficient of the vehicle. The vehicle parameter estimation module is also configured to determine an error value based on the first estimate of the vehicle parameter and values of the vehicle operating conditions measured or estimated at a second time that is later than the first time. The vehicle parameter estimation module is further configured to generate a second estimate of the vehicle parameter based on the first estimate of the vehicle parameter and the error value. The vehicle actuator control module is configured to control an actuator of the vehicle based on the second estimate of the vehicle parameter.

In one aspect, the vehicle parameter includes the vehicle tire cornering stiffness, and the vehicle operating conditions include a lateral velocity of the vehicle and a load exerted on the vehicle by a tongue of a trailer towed by the vehicle.

In one aspect, the vehicle operating conditions further include a bank angle of a road on which the vehicle is travelling.

In one aspect, the vehicle parameter includes the vehicle understeer coefficient, and the vehicle operating conditions include a lateral acceleration of the vehicle.

In one aspect, the vehicle parameter includes the vehicle understeer coefficient, and the vehicle operating conditions include a bank angle of a road on which the vehicle is travelling.

In one aspect, the system further includes a vehicle state prediction module configured to predict a value of a vehicle state at a future time based on the second estimate of the vehicle parameter, the vehicle state includes at least one of a yaw rate of the vehicle and a lateral velocity of the vehicle, and the vehicle actuator control module is configured to control the vehicle actuator to adjust a lateral position of the vehicle based on the predicted value of the vehicle state.

In one aspect, the vehicle parameter includes the vehicle tire cornering stiffness, and the vehicle state includes both the vehicle yaw rate and the vehicle lateral velocity.

In one aspect, the vehicle parameter includes the vehicle understeer coefficient, and the vehicle state includes the vehicle yaw rate.

In one aspect, the vehicle parameter estimation module is configured to determine a third estimate of the vehicle parameter based on a sum of a mass of the vehicle and a mass of a trailer towed by the vehicle, and the vehicle actuator control module is configured to control the vehicle actuator to adjust a lateral position of the vehicle based on one of the second and third estimates of the vehicle parameter.

In one aspect, the vehicle actuator control module is configured to select the one of the second and third estimates of the vehicle parameter based on the error value associated with the second and third estimates.

In one aspect, the vehicle parameter includes the vehicle understeer coefficient.

In one aspect, the system further includes a user interface device control module configured to control a user interface device to notify a driver of a potentially unstable condition when the second estimate of the vehicle understeer coefficient is less than a threshold.

In one aspect, the vehicle actuator control module is configured to (i) control the vehicle actuator to adjust a lateral position of the vehicle when the second estimate of the vehicle understeer coefficient is greater than or equal to a threshold and (ii) stop controlling the vehicle actuator to adjust the vehicle lateral position when the second estimate of the vehicle understeer coefficient is less than the threshold.

In one aspect, when the second estimate of the vehicle understeer coefficient is less than a threshold, the vehicle actuator control module is configured to (i) determine a critical speed of the vehicle based on the second estimate of the vehicle understeer coefficient and (ii) maintain an actual speed of the vehicle at a value that is less than the critical speed.

Another example of a system according to the present disclosure includes a vehicle parameter estimation module, a vehicle state prediction module, and a vehicle actuator control module. The vehicle parameter estimation module is configured to generate an estimate of a vehicle parameter based a sum of a mass of a vehicle and a mass of a trailer towed by the vehicle. The vehicle parameter includes at least one of a tire cornering stiffness of the vehicle and an understeer coefficient of the vehicle. The vehicle state prediction module is configured to predict a vehicle state at a future time based on the estimate of the vehicle parameter using a vehicle dynamics model. The vehicle state includes at least one of a yaw rate of the vehicle and a lateral velocity of the vehicle. The vehicle parameter estimation module is configured to determine an error of the vehicle dynamics model based on measured operating conditions of the vehicle. The vehicle actuator control module is configured to control an actuator of the vehicle based on the predicted value of the vehicle state and the model error.

In one aspect, the vehicle parameter estimation module is configured to adjust the estimate of the vehicle parameter based on the model error, and the vehicle state prediction module is configured to predict the vehicle state based on one of the unadjusted estimate of the vehicle parameter and the adjusted estimate of the vehicle parameter.

In one aspect, the vehicle state prediction module is configured to select the one of the unadjusted and adjusted estimates of the vehicle parameter based on the model error associated with the unadjusted and adjusted estimates.

In one aspect, the vehicle parameter includes the vehicle tire cornering stiffness, and the vehicle state includes both the vehicle yaw rate and the vehicle lateral velocity.

In one aspect, the vehicle parameter includes the vehicle understeer coefficient, and the vehicle state includes the vehicle yaw rate.

An example of a method according to the present disclosure includes determining a first estimate of a vehicle parameter based on operating conditions of a vehicle measured or estimated at a first time using a vehicle dynamics model. The vehicle parameter includes at least one of a tire cornering stiffness of the vehicle and an understeer coefficient of the vehicle. The method also includes determining an error in the vehicle dynamics model based on the first estimate of the vehicle parameter and values of the vehicle operating conditions measured or estimated at a second time that is later than the first time. The method further includes determining a second estimate of the vehicle parameter based on the first estimate of the vehicle parameter and the model error, and controlling an actuator of the vehicle to adjust a lateral position of the vehicle based on the second estimate of the vehicle parameter.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

When a vehicle control system performs ADAS functions on a vehicle towing a trailer, the performance of the ADAS functions may be impacted by the payload in the vehicle, the payload in the trailer, and the configuration of the payload in the trailer. In one example, when performing lane centering control, a vehicle control system estimates the combined mass of the vehicle and the trailer and estimates an understeer coefficient of the vehicle based on the estimated mass using a lookup table. The vehicle control system then determines how to adjust vehicle actuators to keep the vehicle centered in a lane based on the estimated understeer coefficient using a vehicle dynamics model. Thus, if there is error in the vehicle dynamics model, the vehicle control system may not keep the vehicle centered in the lane.

In addition, the lookup table used to estimate the understeer coefficient is populated with data by adjusting the payload of the trailer to different amounts and determining the understeer coefficient based on measured operating conditions of the vehicle. If the payloads in the vehicle or the trailer are different than the payloads that were in the vehicle and the trailer when the lookup table was populated with data, the estimated understeer coefficient obtained from the lookup table may be inaccurate. In turn, the vehicle control system may not keep the vehicle centered in the lane. While the lookup table may be populated with additional data to minimize the likelihood that the estimated understeer coefficient obtained from the lookup table is inaccurate, doing so requires additional calibration effort.

A vehicle control system according to the present disclosure addresses these issues by adjusting the estimated understeer coefficient based on vehicle operating conditions. In one example, the vehicle control system generates an initial estimate of the understeer coefficient based on the vehicle and trailer mass and predicts a vehicle yaw rate based on the initial estimate using a vehicle dynamics model. The vehicle control system then determines the model error based on the vehicle yaw rate and measured vehicle operating parameters, and generates a subsequent estimate of the understeer coefficient based on the initial estimate and the model error using, for example, recursive least squares. In this way, the vehicle control system adaptively adjusts the estimated understeer coefficient to mitigate the model error and account for various payloads and trailer configurations, which improves its performance of ADAS functions such as lane centering control. In addition, the vehicle control system uses estimated vehicle parameters to predict the motion of a vehicle towing a trailer without needing sensors on the trailer.

Figure 1:
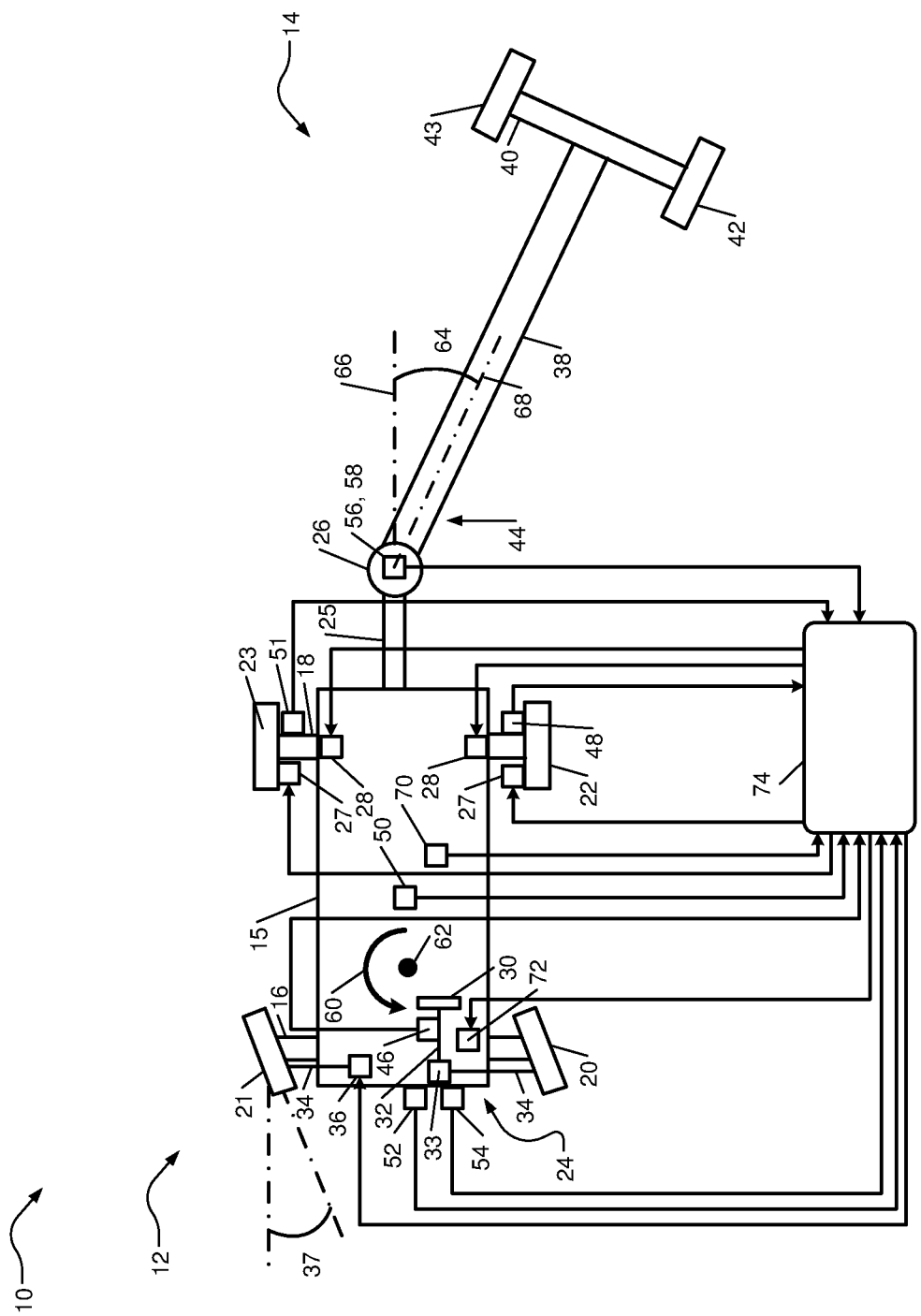
FIG. 1 is a functional block diagram of an example vehicle and trailer system according to the principles of the present disclosure.

Referring now to FIG. 1, a vehicle and trailer system 10 includes a vehicle 12 and a trailer 14 that is connected to and towed by the vehicle 12. The vehicle 12 includes a frame or body 15, a front axle 16, a rear axle 18, a left front wheel 20, a right front wheel 21, a left rear wheel 22, a right rear wheel 23, a steering system 24, a trailer hitch 25 having a distal end or ball 26, friction brakes 27, and electric motors 28. In the example shown, the steering system 24 is operable to turn the left and right front wheels 20 and 21 and thereby turn the vehicle 12. Additionally or alternatively, the steering system 24 may be operable to turn the left and right rear wheels 22 and 23 and thereby turn the vehicle 12.

The steering system 24 includes a steering wheel 30, a steering column 32, a steering gear 33, a steering linkage 34, and a steering actuator 36. A driver of the vehicle 12 rotates the steering wheel 30 to turn the vehicle 12 left or right. The steering column 32 is coupled to the steering wheel 30 so that the steering column 32 rotates when the steering wheel 30 is rotated. The steering gear 33 couples the steering column 32 to the steering linkage 34 so that rotation of the steering column 32 causes translation of the steering linkage 34. The steering linkage 34 is coupled to the left and right front wheels 20 and 21 so that translation of the steering linkage 34 turns the left and right front wheels 20 and 21.

The steering actuator 36 is coupled to the steering linkage 34 and is operable to translate the steering linkage 34 and thereby adjust a steering angle 37 the left and right front wheels 20 and 21. The steering actuator 36 may be a hydraulic and/or electric actuator. If the steering column 32 is coupled to the steering linkage 34 as shown in FIG. 1, the steering actuator 36 may reduce the amount of effort that the driver must exert to turn the vehicle 12 left or right. In various implementations, the steering column 32 may not be coupled to the steering linkage 34 (i.e., the steering gear 33 may be omitted), and the steering actuator 36 may translate the steering linkage 34 in response to an electronic signal that is generated based on the position of the steering wheel 30. When the steering actuator 36 is electronically controlled in this way, the steering system 24 may be referred to as a steer-by-wire system.

In the example shown in FIG. 1, the friction brakes 27 are operable to decrease the rotational speed of the left and right rear wheels 22 and 23. In addition, the electric motors 28 are operable to rotate the left and right rear wheels 22 and 23 to cause the vehicle 12 to move forward or rearward. In various implementations, the friction brakes 27 may be operable to decrease the rotational speed of the left and right front wheels 20 and 21. In addition, the electric motors 28 may be operable to rotate the left and right front wheels 20 and 21 to cause the vehicle 12 to move forward or rearward. In various implementations, the vehicle 12 may include an internal combustion engine (not shown) in addition to or instead of the electric motors 28, and the engine may be operable to drive the left and right front wheels 20 and 21 and/or the left and right rear wheels 22 and 23.

The trailer 14 includes a frame or body 38, an axle 40, a left wheel 42, a right wheel 43, and a tongue 44. The tongue 44 of the trailer 14 may be placed onto the ball 26 of the trailer hitch 25 of the vehicle 12 to couple the trailer 14 to the vehicle 12. The system 10 may further include one or more weight distribution bars (not shown) mounted on the vehicle 12. The weight distribution bars distribute parts of the weight of the trailer hitch 25 from the rear axle 18 of the vehicle 12 to the front axle 16 of the vehicle 12 and to the axle 40 of the trailer 14.

The vehicle 12 further includes a steering wheel position sensor 46, a wheel speed sensor 48, a vehicle motion sensor 50, an axle torque sensor 51, a camera 52, a light detection and ranging (LIDAR) sensor 54, a trailer tongue load sensor 56, and a trailer hitch angle sensor 58. The steering wheel position sensor 46 measures the angular position of the steering wheel 30 and generates a signal indicating the steering wheel angular position. The steering wheel position sensor 46 may include a magnet mounted to the steering column 32 and a Hall effect sensor that detects the intensity of a magnetic field generated by the magnet.

The wheel speed sensor 48 measures the rotational speed of the left rear wheel 22 of the vehicle 12 and generates a signal indicating the left rear wheel speed. Although the wheel speed sensor 48 is shown mounted to the left rear wheel 22, the wheel speed sensor 48 may measure the speed of another wheel of the vehicle 12. In various implementations, the vehicle 12 may include multiple wheel speed sensors to measure the speeds of multiple wheels of the vehicle 12. The vehicle control module 74 may determine the longitudinal velocity of the vehicle 12 based on the wheel speed(s) measured by the wheel speed sensor(s).

The vehicle motion sensor 50 measures the longitudinal (fore-aft) acceleration of the vehicle 12, the lateral (side-to-side) acceleration of the vehicle 12, and the yaw rate of the vehicle 12. The yaw rate of the vehicle 12 is the rate at which the vehicle 12 rotates in a yaw direction 60 about its center of gravity 62). The vehicle motion sensor 50 may be an inertial measurement unit, which may include accelerometers that measure the longitudinal and lateral vehicle acceleration and a gyroscope that measures the vehicle yaw rate. The vehicle motion sensor 50 generates a signal indicating the vehicle longitudinal acceleration, the vehicle lateral acceleration, and the vehicle yaw rate.

The axle torque sensor 51 measures the amount of drive torque applied to the rear axle 18 by the electric motors 28 and generates a signal indicating the rear axle torque. Instead of or in addition to the axle torque sensor 51, the vehicle 12 may include an axle torque sensor that measures the amount of drive torque applied to the front axle 16 by the electric motors 28 and generates a signal indicating the front axle torque. The axle torque sensor(s) may be incorporated into one or more of the electric motors 28. Additionally or alternatively, the vehicle control module 74 may estimate the front and/or rear axle torque based on the amount of power supplied to the electric motors 28 and/or the rotational speeds of the wheels 20-23.

The camera 52 captures images of an environment around the vehicle 12 and generates a signal indicating the images. In the example shown, the camera 52 is mounted to the front end of the vehicle 12, and therefore is positioned to capture images of the environment in front of the vehicle 12. In various implementations, the camera 52 may be a 360-degree camera that is operable to capture images of the environment in front of the vehicle 12, to the rear of the vehicle 12, and on both sides of the vehicle 12. Additionally or alternatively, the vehicle 12 may include multiple cameras that, collectively, are operable to capture images of the environment in front of the vehicle 12, to the rear of the vehicle 12, and on both sides of the vehicle 12.

The LIDAR sensor 54 measures the distances to objects near the vehicle 12 using a laser and generates a signal indicating the distances. In the example shown, the LIDAR sensor 54 is mounted at the front end of the vehicle 12, and therefore the LIDAR sensor 54 is positioned to measure distances to objects in front of the vehicle 12. In various implementations, the vehicle 12 may include multiple LIDAR sensors that measure the distances to objects in front of the vehicle 12, to the rear of the vehicle 12, and on both sides of the vehicle 12.

The trailer tongue load sensor 56 measures the load exerted by the tongue 44 of the trailer 14 on the trailer hitch 25 of the vehicle 12 and generates a signal indicating the trailer tongue load. The trailer hitch angle sensor 58 measures a hitch articulation angle 64 between a longitudinal axis 66 of the vehicle 12 and a longitudinal axis 68 of the trailer 14 and generates a signal indicating the hitch articulation angle 64. The trailer tongue load sensor 56 and the trailer hitch angle sensor 58 may be incorporated in the trailer hitch 25 of the vehicle 12 on or near the ball 26. In various implementations, the trailer tongue load and the hitch articulation angle 64 may be estimated based on other operating conditions of the system 10, in which case the trailer tongue load sensor 56 and the trailer hitch angle sensor 58 may be omitted.

The vehicle 12 further includes a global positioning system (GPS) receiver 70, a user interface device 72, and a vehicle control module 74. The GPS receiver 70 receives signals from global navigation satellite system (GNSS) satellites, determines the geographic location of the vehicle 12 based on wireless signals, and generates a signal indicating the vehicle geographic location. The vehicle control module 74 may determine the longitudinal velocity of the vehicle 12, the lateral velocity of the vehicle 12, and/or the yaw rate of the vehicle 12 based on the vehicle geographic location. The GPS receiver 70 includes one or more (e.g., two) GPS antennas.

The vehicle control module 74 may store high definition (HD) maps and determine where the vehicle 12 is located on the HD maps based on inputs received from the LIDAR sensor 54 and the GPS receiver 70. The vehicle control module 74 may then determine the bank angle of the road on which the vehicle 12 is travelling based on the vehicle location using the HD map data. In various implementations, the GPS receiver 70 may be incorporated into the vehicle control module 74.

The user interface device 72 is disposed within a cabin of the vehicle 12 and is operable to generate a visual message (e.g., text, a light, and/or a symbol), an audible message (e.g., a chime), and/or a tactile message (e.g., a vibration). The user interface device 72 may include an electronic display (e.g., a touchscreen), a speaker, and/or a vibrating motor. The user interface device 72 may also be operable to generate signals in response to voice or touch commands from a user of the vehicle 12.

The vehicle control module 74 controls one or more actuators of the vehicle 12, such as the friction brakes 27, the steering actuator 36, and/or the electric motors 28, to adjust the longitudinal velocity of the vehicle 12, the lateral position of the vehicle 12, the heading of the vehicle 12, and the yaw rate of the vehicle 12. For example, the vehicle control module 74 may control the friction brakes 27 and the electric motors 28 to adjust the vehicle longitudinal velocity, and the vehicle control module 74 may control the steering actuator 36 to adjust the vehicle lateral position. The vehicle control module 74 adjusts the vehicle longitudinal velocity, the vehicle lateral position, the vehicle heading, and the vehicle yaw rate based on inputs from the sensors of the vehicle 12.

The vehicle control module 74 performs ADAS functions such as adaptive cruise control, electronic stability control, lane keep assist, and/or lane centering control. When performing such functions, the vehicle control module 74 predicts the vehicle lateral velocity and/or the vehicle yaw rate and adjusts commands sent to vehicle actuators such as the friction brakes 27, the electric motors 28, and the steering actuator 36 to minimize the difference between the predicted and target values of the vehicle lateral velocity and/or the vehicle yaw rate. Thus, the vehicle control module 74 performs ADAS functions such as those noted above using a feedforward approach. The vehicle control module 74 may also perform such ADAS functions using a feedback approach.

The vehicle control module 74 predicts the vehicle yaw rate based on cornering stiffnesses of the vehicle 12 or an understeer coefficient of the vehicle 12 using a vehicle dynamics model. Additionally or alternatively, the vehicle control module 74 may predict the vehicle lateral velocity based on the tire cornering stiffnesses using a vehicle dynamics model. When the trailer 14 is first connected to the vehicle 12, or when the payload in the vehicle 12 and/or the trailer 14 is adjusted, the vehicle control module 74 generates an initial estimate of the tire cornering stiffnesses or the understeer coefficient based on the total mass of the system 10 (i.e., the sum of the mass of the vehicle 12 and the mass of the trailer 14) using a predetermined relationship (e.g., a lookup table).

The vehicle control module 74 generates new estimates of the tire cornering stiffnesses or the understeer coefficient based on the initial estimate and operating conditions of the vehicle 12 using recursive least squares. The vehicle control module 74 uses the new estimates of the tire cornering stiffnesses or the understeer coefficient to make new predictions of the vehicle yaw rate and/or the vehicle lateral velocity. The vehicle control module 74 uses the new predictions of the vehicle yaw rate and/or the vehicle lateral velocity to perform ADAS functions such as lane keep assist, lane centering control, adaptive cruise control, and/or electronic stability control.

Figure 2:
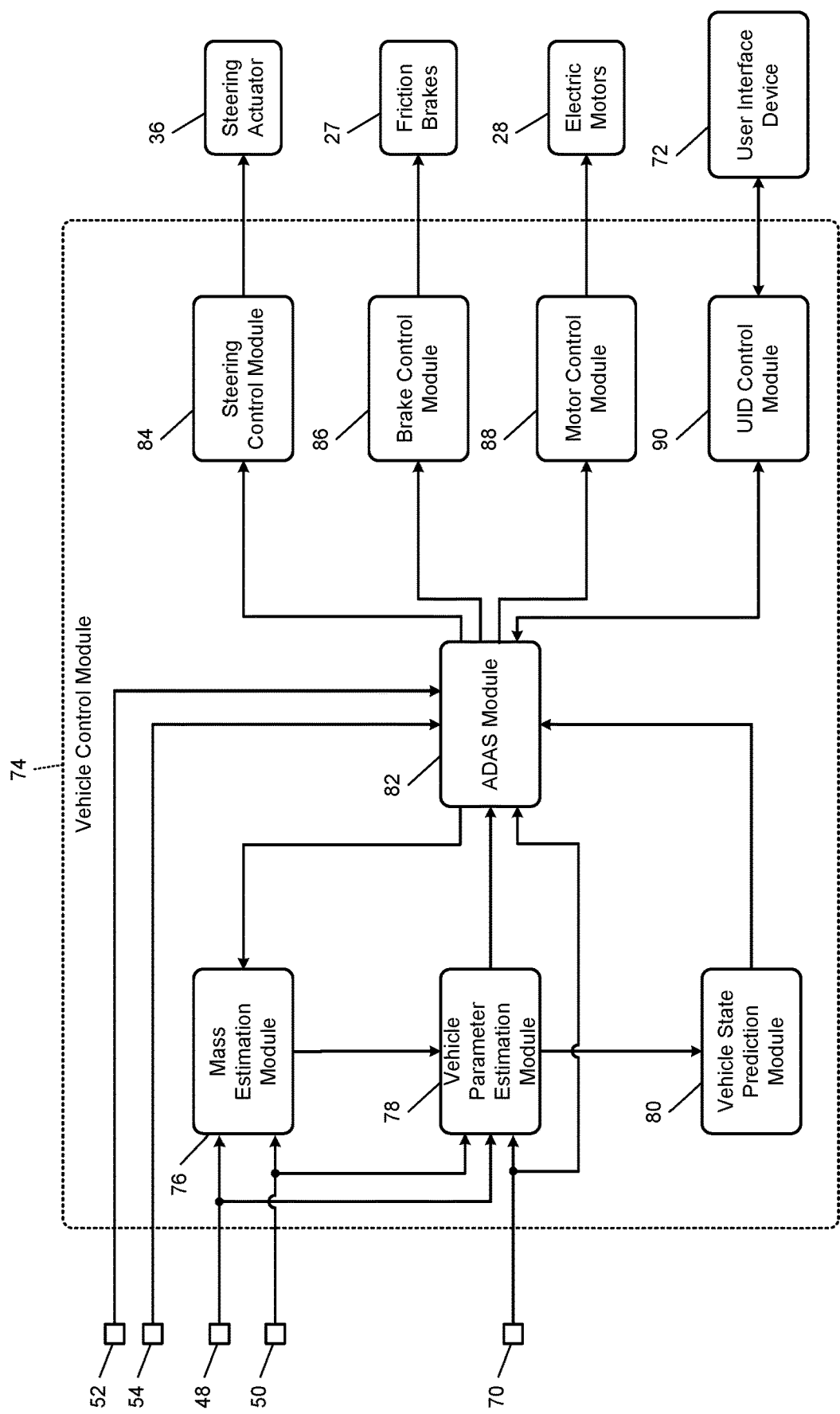
FIG. 2 is a functional block diagram of an example control system according to the principles of the present disclosure.

Referring now to FIG. 2, an example implementation of the vehicle control module 74 includes a mass estimation module 76, a vehicle parameter estimation module 78, a vehicle state prediction module 80, and an ADAS module 82. The mass estimation module 76 estimates the total mass of the system 10 and generates a signal indicating the total mass. The mass estimation module 76 may estimate the total mass by balancing the longitudinal forces acting on the system 10 in an equation and rearranging the force balance equation to solve for the total mass. For example, the mass estimation module 76 may estimate the total mass using a relationship such as $$F_T = F_d - F_b - F_a - F_r, \quad (1)$$

where Ft is the total force acting on the system 10, Fd is the drive force applied by the electric motors 28, Fb is the brake force applied by the friction brakes 27, Fa is the aerodynamic drag force, and Fr is road friction force.

Some of the terms of relationship (1) may be replaced with the products of multiple terms to form a relationship such as $$Ma_x = F_d - K_b P_b - K_x V_x^2 - \mu Mg, \quad (2)$$

where M is the total mass of the system 10, $a_x$ is the vehicle longitudinal acceleration, Kb is a brake force coefficient, Pb is the pressure of brake fluid supplied to the friction brakes 27, Kx is an aerodynamic drag force coefficient, Vx is the vehicle longitudinal velocity, μ is a road friction force coefficient, and g is the acceleration of gravity. Relationship (2) may be rearranged to solve for the total mass of the system 10. The mass estimation module 76 may receive the vehicle longitudinal velocity and the vehicle longitudinal acceleration of the system 10 from the wheel speed sensor 48 and the vehicle motion sensor 50, respectively. The mass estimation module 76 may also receive the brake pressure from a brake pressure sensor (not shown) that measures the same. The brake force coefficient, the aerodynamic drag force coefficient, the road friction force coefficient, and the acceleration of gravity may be predetermined constants.

The vehicle parameter estimation module 78 estimates cornering stiffnesses of the vehicle 12 or an understeer coefficient of the vehicle 12. The vehicle parameter estimation module 78 may not estimate the tire cornering stiffnesses if the vehicle parameter estimation module 78 estimates the understeer coefficient and vice versa. The vehicle parameter estimation module 78 generates an initial estimate of the tire cornering stiffnesses or the understeer coefficient based on the total mass of the system 10 using, for example, a function or a mapping (e.g., a lookup table). The vehicle state prediction module 80 then predicts the vehicle yaw rate and/or the vehicle lateral velocity based on the initial estimate of the tire cornering stiffnesses or the understeer coefficient and measured operating conditions of the vehicle 12 using a vehicle dynamics model. The vehicle parameter estimation module 78 then determines the error in the vehicle dynamics model based on newly measured vehicle operating conditions and generates subsequent estimates of the tire cornering stiffnesses or the understeer coefficient using recursive least squares to mitigate the model error. The vehicle parameter estimation module 78 generates a signal indicating the current estimate (e.g., the initial or subsequent estimate) of the tire cornering stiffnesses or the understeer coefficient.

The vehicle parameter estimation module 78 may generate the subsequent estimates of the tire cornering stiffnesses using a relationship that balances the forces and moments acting on the vehicle 12 at steady-state in terms of lateral dynamics. For example, if the road bank angle is available from HD map data, the vehicle parameter estimation module 78 may generate the subsequent estimates of the tire cornering stiffnesses using a relationship such as $$\begin{bmatrix} (m+T)(V_x\omega_z + g\sin\phi_r) \\ -l_h T(V_x\omega_z + g\sin\phi_r) \end{bmatrix} = \begin{bmatrix} \beta_f & \beta_r \\ l_f\beta_f & -l_r\beta_r \end{bmatrix} \begin{bmatrix} C_f \\ C_r \end{bmatrix}, \quad (3)$$

where m is the mass of the vehicle 12, T is the trailer tongue load, Vx is the vehicle longitudinal velocity, $\omega_z$ is the vehicle yaw rate, g is the acceleration of gravity, $\phi_r$ is the road bank angle, $\beta_f$ and $\beta_r$ are the front and rear tire slip angles, respectively, Cf and Cr are the front and rear tire cornering stiffnesses, respectively, $I_h$ is the distance from the center of gravity 62 of the vehicle 12 to the ball 26 on the trailer hitch 25, and $I_f$ and $I_r$ are the distances from the center of gravity 62 of the vehicle 12 to the front and rear axles 16 and 18, respectively.

The vehicle parameter estimation module 78 may receive the trailer tongue load from the trailer tongue load sensor 56. Alternatively, the vehicle parameter estimation module 78 may assume that the trailer tongue load is a fixed fraction of the mass of the trailer 14, in which case the trailer tongue load sensor 56 may be omitted. The vehicle parameter estimation module 78 may receive the vehicle longitudinal velocity and the vehicle yaw rate from the wheel speed sensor 48 and the vehicle motion sensor 50, respectively. The vehicle parameter estimation module 78 may determine the front and rear tire slip angles based on the vehicle lateral velocity, the vehicle yaw rate, and the front and rear steering angles using a predetermined relationship therebetween. The vehicle parameter estimation module 78 may determine the vehicle lateral velocity based on the input from the camera 52 and/or the GPS receiver 70. The distances from the center of gravity 62 of the vehicle 12 to the trailer hitch 25, the front axle 16, and the rear axle 18 may be predetermined.

If the road bank angle is not available from HD map data, the vehicle parameter estimation module 78 may approximate the road bank angle using the vehicle lateral acceleration and/or the vehicle yaw rate. Additionally, the vehicle parameter estimation module 78 may approximate the road bank angle using the roll rate of the vehicle 12. The vehicle parameter estimation module 78 may then extract the vehicle roll angle from the vehicle lateral acceleration and generate the subsequent estimates of the tire cornering stiffnesses using a relationship such as $$\begin{bmatrix} (m+T)A_y \\ -l_n TA_y \end{bmatrix} = \begin{bmatrix} \beta_f & \beta_r \\ l_f\beta_f & -l_r\beta_r \end{bmatrix} \begin{bmatrix} C_f \\ C_r \end{bmatrix}, \quad (4)$$

where Ay is the vehicle lateral acceleration. The vehicle parameter estimation module 78 may receive the vehicle lateral acceleration from the vehicle motion sensor 50.

The vehicle parameter estimation module 78 may also generate the subsequent estimates of the understeer coefficient using a relationship that balances the forces and moments acting on the vehicle 12 at steady-state. For example, if the road bank angle is available from HD map data, the vehicle parameter estimation module 78 may generate the subsequent estimates of the understeer coefficient using a relationship such as $$V_x(\delta_f - \delta_r) - L\omega_z = (V_x^2\omega_z + V_x g \sin \phi_r)K_{us}, \quad (5)$$

where $K_{us}$ is the understeer coefficient, $\delta_f$ and $\delta_r$ are the front and rear steering angles, respectively, and L is the wheelbase of the vehicle 12. The vehicle parameter estimation module 78 may determine the front and rear steering angles based on the steering wheel angular position from the steering wheel position sensor 46. The vehicle wheelbase may be predetermined constants. The rear steering angle may also be a predetermined constant if the vehicle 12 is not equipped with rear steering.

If the road bank angle is not available from HD map data, the vehicle parameter estimation module 78 may approximate the road bank angle using the roll angle of the vehicle 12. The vehicle parameter estimation module 78 may then extract the vehicle roll angle from the vehicle lateral acceleration and generate the subsequent estimates of the understeer coefficient using a relationship such as $$V_x(\delta_f - \delta_r) - L\omega_z = V_x A_y K_{us}. \quad (6)$$

In contrast to relationships (3) and (4), relationships (5) and (6) do not require the trailer tongue load to be known or assumed.

The vehicle parameter estimation module 78 generates a first subsequent estimate of the tire cornering stiffnesses or the understeer coefficient based on vehicle operating conditions measured at a first time. The vehicle state prediction module 80 then predicts the vehicle yaw rate and/or the vehicle lateral velocity at a second time using a vehicle dynamics model. The second time is later than the first time. The vehicle parameter estimation module 78 then determines the error in the vehicle dynamics model based on vehicle operating conditions measured at the second time and generates a second subsequent estimate of the tire cornering stiffnesses or the understeer coefficient based on the first subsequent estimate the tire cornering stiffnesses or the understeer coefficient and the model error using recursive least squares. In this way, the vehicle parameter estimation module 78 adaptively adjusts its estimate of the tire cornering stiffnesses or the understeer coefficient to mitigate the model error. The first and second times may correspond to first and second iterations. The vehicle parameter estimation module 78 and the vehicle state prediction module 80 may repeat the above process on an iterative basis at every time step after the first time.

In one example, the vehicle parameter estimation module 78 adjusts its estimate of the tire cornering stiffnesses or the understeer coefficient using a relationship such as $$\hat{x}_i = \hat{x}_{i-1} + K_i(y_i - H_i\hat{x}_{i-1}), \quad (7)$$

where $x_i$ is the estimate of the tire cornering stiffnesses or the understeer coefficient for the current iteration, $x_{i-1}$ is the estimate of the tire cornering stiffnesses or the understeer coefficient for the previous iteration, $K_i$ is a Kalman gain for the current iteration, and $y_i$ and $H_i$ are terms representing measured vehicle operating conditions for the current iteration. More specifically, $y_i$ is the left side of relationships (3), (4), (5), or (6), and $H_i$ is the first term on the right side of relationships (3), (4), (5), or (6) (i.e., the term that is multiplied by the tire cornering stiffnesses or the understeer coefficient). Hi, xi, and yi are obtained from the same one of relationships (3), (4), (5), or (6). The term $y_i - H_i\hat{x}_{i-1}$ in relationship (7) represents the error in the vehicle dynamics model used to predict the vehicle yaw rate and/or the vehicle lateral velocity. The Kalman gain governs the rate of change in the estimate of the tire cornering stiffnesses or the understeer coefficient in response to the model error, as well as how sensitive that estimate is to changes in the measured vehicle operating conditions. The parameter estimation module 78 outputs the estimated tire cornering stiffnesses or the estimated understeer coefficient for the current iteration.

The vehicle parameter estimation module 78 may only adaptively adjust its estimate of the tire cornering stiffnesses or the understeer coefficient when the level of lateral force excitation is greater than a threshold and the vehicle operating conditions are steady-state. The level of lateral force excitation may be greater than the threshold when the vehicle 12 is traveling through a curve in a road. The vehicle 12 does not necessarily need to be in a skid for the level of lateral force excitation to be greater than the threshold. The vehicle operating conditions may be steady-state when the vehicle longitudinal acceleration is less than a threshold and the rate of change in the vehicle yaw rate is less than a threshold.

The vehicle state prediction module 80 may predict the vehicle yaw rate and the vehicle lateral velocity based on the estimated tire cornering stiffnesses using a vehicle dynamics model. Alternatively, the vehicle state prediction module 80 may predict only the vehicle yaw rate based on the estimated understeer coefficient using a vehicle dynamics model. The vehicle dynamic(s) model used by the vehicle state prediction module 80 to predict the vehicle yaw rate and/or the vehicle lateral velocity may be different than relationships (3), (4), (5), and (6). The vehicle state prediction module 80 generates a signal indicating the predicted vehicle yaw rate and/or the predicted vehicle lateral velocity.

The vehicle state prediction module 80 may select one of (i) the initial estimate of the tire cornering stiffnesses or the understeer coefficient and (ii) the most recent subsequent estimate of the tire cornering stiffnesses or the understeer coefficient. The vehicle state prediction module 80 may then predict the vehicle yaw rate and/or the vehicle lateral velocity based on the selected one of the initial and subsequent estimates of the tire cornering stiffnesses or the understeer coefficient. The vehicle state prediction module 80 may select one of the initial and subsequent estimates of the tire cornering stiffnesses or the understeer coefficient based on the model error associated therewith. For example, the vehicle state prediction module 80 may select the subsequent estimate of the tire cornering stiffnesses or the understeer coefficient if the model error associated with the subsequent estimate is less than the model error associated with the initial estimate of the tire cornering stiffnesses or the understeer coefficient. Additionally or alternatively, the vehicle state prediction module 80 may select one of the initial and subsequent estimates of the tire cornering stiffnesses or the understeer coefficient based on the duration of the current trip. For example, the vehicle state prediction module 80 may select the initial estimate of the tire cornering stiffnesses or the understeer coefficient during an initial period of the current trip, and thereafter the vehicle state prediction module 80 may select the most recent subsequent estimate of the tire cornering stiffnesses or the understeer coefficient. In various implementations, the vehicle parameter estimation module 78 may generate an uncertainty variable associated with each estimate of the tire cornering stiffnesses and the understeer coefficient, and the vehicle state prediction module 80 may select between multiple estimates of the tire cornering stiffnesses or the understeer coefficient based on the uncertainty variable associated therewith. For example, the vehicle state prediction module 80 may select the most recent subsequent estimate of the tire cornering stiffnesses or the understeer coefficient when the magnitude of the uncertainty variable associated therewith is less than a threshold.

The ADAS module 82 performs ADAS functions such as lane keep assist, lane centering control, adaptive cruise control, and/or electronic stability control based on an estimated parameter, such as the tire cornering stiffnesses and/or the understeer coefficient, and/or a predicted state, such as the predicted vehicle yaw rate and/or the predicted vehicle lateral velocity. In one example, the ADAS module 82 performs such ADAS functions by adjusting a target steering angle, a target braking torque, and/or a target motor torque to minimize a difference between the predicted vehicle yaw rate and a target yaw rate and/or a difference between the predicted vehicle lateral velocity and a target lateral velocity. The ADAS module 82 then generates a signal indicating the target steering angle, the target braking torque, and/or the target motor torque. In another example, the ADAS module 82 uses the estimated parameters to back-calculate the actuator commands that achieve the target values.

When performing lane centering control, the ADAS module 82 adjusts the target steering angle, a target braking torque, and/or a target motor torque to minimize (i) a difference between the vehicle lateral position and a centerline of a lane within which the vehicle 12 is travelling and (ii) a difference between the vehicle heading and a target heading. The ADAS module 82 may accomplish this by adjusting the target yaw rate and/or the target lateral velocity. The ADAS module 82 may determine the vehicle lateral position and the location of the lane centerline based on an input from one or more of the camera 52, the LIDAR sensor 54, and the GPS receiver 70.

The ADAS module 82 may also detect potentially unstable conditions (e.g., fishtailing, jackknifing) due to a negative understeer coefficient and take measures to prevent or mitigate the unstable conditions. In one example, the ADAS module 82 generates a signal indicating a target message when the estimated understeer coefficient is less than a threshold (e.g., zero or a sum of zero and a safety factor). In another example, the ADAS module 82 disables lane centering control, and therefore stops adjusting the vehicle lateral position and the vehicle heading, when the estimated understeer coefficient is less than the threshold. In yet another example, the ADAS module 82 calculates a critical speed of the vehicle 12 based on the estimated understeer coefficient and decreases a set speed used for adaptive cruise control to maintain the vehicle speed at a value that is less than the critical speed.

The example implementation of the vehicle control module 58 shown in FIG. 2 further includes a steering control module 84, a brake control module 86, a motor control module 88, and a user interface device (UID) control module 90. The steering control module 84 steers the vehicle 12 by controlling the steering actuator 36 to adjust the steering angle 37 of the vehicle 12. The steering control module 84 steers the vehicle 12 in response to the angular position of the steering wheel 30 measured by the steering wheel position sensor 46. In addition, the steering control module 84 steers the vehicle 12 based on the target steering angle from the ADAS module 82.

The brake control module 86 decreases the speed of the vehicle 12 by applying the friction brakes 27. The brake control module 86 decreases the speed of the vehicle in response to a position of a brake pedal (not shown) of the vehicle 12. In addition, the brake control module 86 may apply one or both of the friction brakes 27, and adjust the magnitude by which the friction brake(s) 27 are applied, based on the target braking torque from the ADAS module 82.

The motor control module 88 adjusts the speed of the vehicle 12 by adjusting the output of the electric motors 28. The motor control module 88 adjusts the output of the electric motors 28 based on a position of accelerator pedal (not shown) of the vehicle 12. In addition, the motor control module 88 may adjusts the output of one or both of the electric motors 28 based on the target motor torque from the ADAS module 82. The ADAS module 82 may specify a target motor torque for each of the electric motors 28.

The UID control module 90 controls the user interface device 72 to generate a message indicating the target message from the ADAS module 82. The target message may notify the driver of the potentially unstable condition, indicate the critical speed, and/or instruct the driver to maintain the vehicle speed at a value that is less than the critical speed. In various implementations, one or more of the steering control module 84, the brake control module 86, the motor control module 88, and the UID control module 90 may be incorporated into the ADAS module 82. The ADAS module 82, the steering control module 84, the brake control module 86, the motor control module 88, and the UID control module 90 may individually or collectively be referred to as a vehicle actuator control module.

Figure 3:
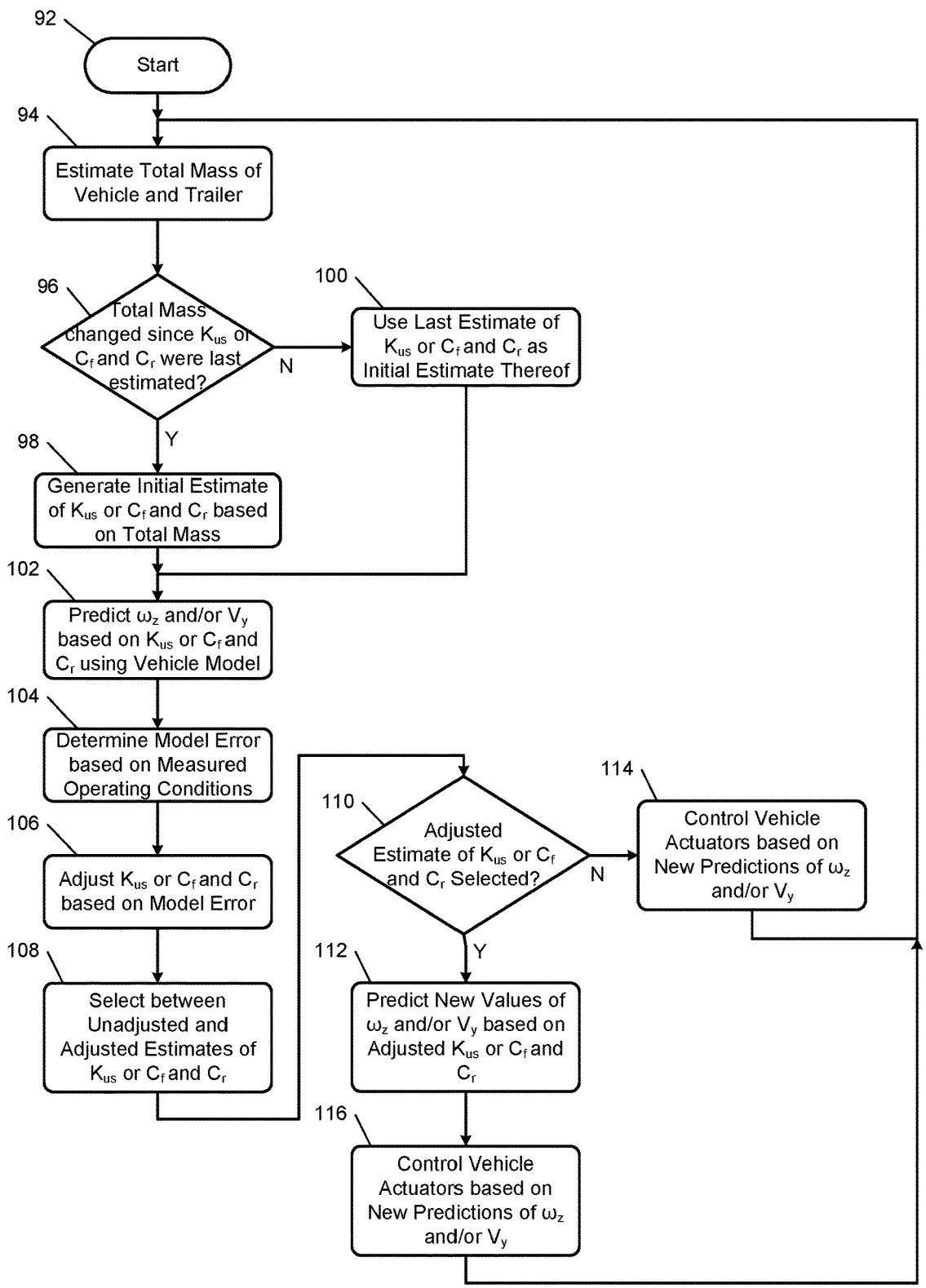
FIGS. 3 and 4 are flowcharts illustrating example control methods according to the principles of the present disclosure.

Referring now to FIG. 3, a method for predicting a vehicle yaw rate and/or a vehicle lateral velocity using a vehicle dynamics model, adaptively adjusting an estimate of an understeer coefficient or front and rear tire cornering stiffnesses to mitigate error in the model, and performing ADAS functions based on the adjusted estimate begins at 92. At 94, the mass estimation module 76 estimates the total mass of the vehicle 12 and the trailer 14. At 96, the vehicle parameter estimation module 78 determines whether the total mass has changed since the understeer coefficient or the tire cornering stiffnesses were last estimated. If the total mass has changed, the method continues at 98. Otherwise, the method continues at 100.

At 98, the vehicle parameter estimation module 78 generates an unadjusted or initial estimate of the understeer coefficient or the tire cornering stiffnesses based on the total mass of the vehicle 12 and the trailer 14. At 100, the vehicle parameter estimation module 78 uses the last estimate of the understeer coefficient or the tire cornering stiffnesses as the unadjusted or initial estimate thereof. At 102, a vehicle state prediction module 80 predicts the vehicle yaw rate and/or the vehicle lateral velocity based on the initial estimate of the understeer coefficient or the tire cornering stiffnesses using a vehicle dynamics model.

At 104, the vehicle parameter estimation module 78 determines the error in the vehicle dynamics model based on measured vehicle operating conditions. At 106, the vehicle parameter estimation module 78 adjusts the initial estimate of the understeer coefficient or the tire cornering stiffnesses based on the model error. At 108, the vehicle state prediction module 80 or the ADAS module 82 selects between the unadjusted and adjusted estimates of the understeer coefficient or the tire cornering stiffnesses. The vehicle state prediction module 80 or the ADAS module 82 may make this selection based on the model error and/or the trip duration as discussed above with reference to the vehicle state prediction module 80. The one of the vehicle state prediction module 80 and the ADAS module 82 that makes this selection may be referred to as an arbitration module.

At 110, the vehicle state prediction module 80 or the ADAS module 82 determines whether the adjusted estimate of the understeer coefficient or the tire cornering stiffnesses was selected at 108. If the adjusted estimate of the understeer coefficient or the tire cornering stiffnesses was selected, the method continues at 112. Otherwise, the method continues at 114.

At 112, the vehicle state prediction module 80 predicts new values of the vehicle yaw rate and/or the vehicle lateral velocity based on the adjusted estimate of the understeer coefficient or the tire cornering stiffnesses using the vehicle dynamics model. At 116, the ADAS module 82 controls vehicle actuators to perform ADAS functions such as adaptive cruise control, electronic stability control, lane keep assist, and/or lane centering control based on the new predictions of the vehicle yaw rate and/or the vehicle lateral velocity. At 114, the ADAS module 82 controls the vehicle actuators to perform such ADAS functions based on the last predictions of the vehicle yaw rate and/or the vehicle lateral velocity (e.g., the predictions from 102). In various implementations, at 114 and 116, the ADAS module 82 controls the vehicle actuators to perform such ADAS functions based directly on the adjusted estimate of the understeer coefficient or the tire cornering stiffnesses.

Figure 4:
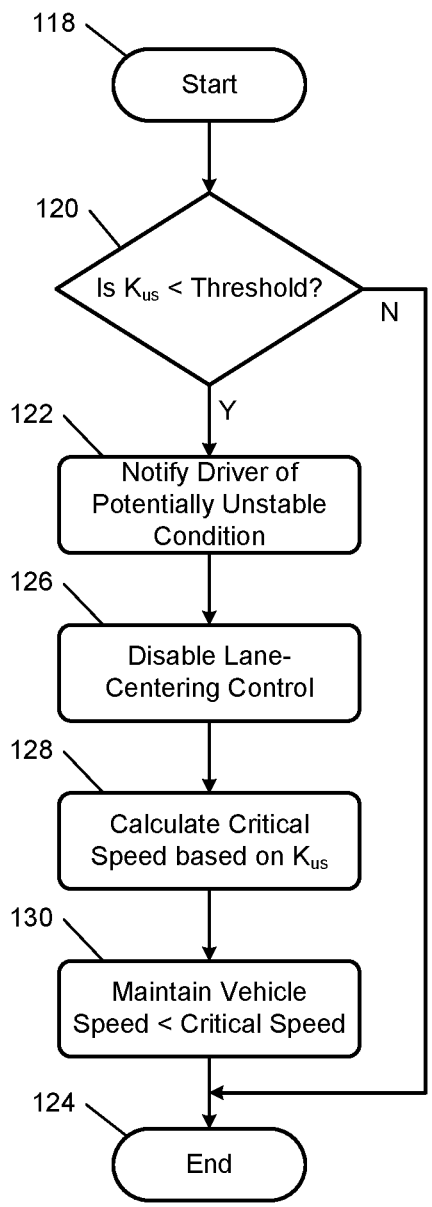

Referring now to FIG. 4, an example method for detecting a potentially unstable condition due to a negative understeer coefficient and taking measures to prevent or mitigate the unstable condition begins at 118. At 120, the ADAS module 82 determines whether the estimated understeer coefficient is less than a threshold. If the estimated understeer coefficient is less than the threshold, the method continues at 122. Otherwise, the method continues at 124. The threshold may be predetermined and/or equal to zero or a sum of zero and a safety factor. The ADAS module 82 may determine the safety factor based on vehicle handling tests, parameter uncertainty, and/or history stability control interventions adapted online.

At 122, the ADAS module 82 controls the user interface device 72 to generate a message notifying the driver of the potentially unstable condition. At 126, the ADAS module 82 disables lane centering control and therefore stops adjusting the vehicle lateral position and the vehicle heading. Additionally or alternatively, at 126, the ADAS module 82 may disable ADAS functions other than lane centering control. At 128, the ADAS module 82 calculates a critical speed of the vehicle 12 based on the estimated understeer coefficient. At 130, the ADAS module 82 decreases a set speed used for adaptive cruise control to maintain the vehicle speed less than the critical speed. The method ends at 124.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
   a vehicle parameter estimation module configured to:
   generate, based on operating conditions of a vehicle measured or estimated at a first time, a first estimate of an understeer coefficient of the vehicle;
   determine, based on (a) the first estimate and (b) values of the operating conditions of the vehicle measured or estimated at a second time that is later than the first time, an error value; and generate, based on the first estimate and the error value, a second estimate of the understeer coefficient of the vehicle;

determine, based on a sum of a mass of the vehicle and a mass of a trailer towed by the vehicle, a third estimate of the understeer coefficient of the vehicle; and a vehicle actuator control module configured to control, based on one of the second estimate and the third estimate, an actuator of the vehicle.

2. The system of claim 1 wherein:
the first, second, and third estimates are of the understeer coefficient of the vehicle and a tire cornering stiffness of the vehicle; and
the operating conditions of the vehicle include a lateral velocity of the vehicle and a load exerted on the vehicle by a tongue of the trailer towed by the vehicle.

3. The system of claim 2 wherein the operating conditions of the vehicle further include a bank angle of a road on which the vehicle is travelling.

4. The system of claim 1 wherein:
the operating conditions of the vehicle include a lateral acceleration of the vehicle.

5. The system of claim 1 wherein:
the operating conditions of the vehicle include a bank angle of a road on which the vehicle is travelling.

6. The system of claim 1 further comprising a vehicle state prediction module configured to predict a value of a vehicle state at a future time based on the second estimate, wherein:
the vehicle state includes at least one of a yaw rate of the vehicle and a lateral velocity of the vehicle; and
the vehicle actuator control module is configured to control the actuator of the vehicle to adjust a lateral position of the vehicle based on the value of the vehicle state.

7. The system of claim 6 wherein:
the first, second, and third estimates are of the understeer coefficient of the vehicle and a tire cornering stiffness of the vehicle; and
the vehicle state includes both the yaw rate of the vehicle and the lateral velocity of the vehicle.

8. The system of claim 6 wherein:
the vehicle state includes the yaw rate of the vehicle.

9. The system of claim 1 wherein:
the vehicle actuator control module is configured to control the actuator of the vehicle to adjust a lateral position of the vehicle based on one of the second and third estimates.

10. The system of claim 9 wherein the vehicle actuator control module is configured to select the one of the second and third estimates based on the error value associated with the second and third estimates.

11. The system of claim 1 further comprising a user interface device control module configured to control a user interface device to notify a driver of a potentially unstable condition when the second estimate of the understeer coefficient of the vehicle is less than a threshold.

12. The system of claim 1 wherein the vehicle actuator control module is configured to:
control the actuator of the vehicle to adjust a lateral position of the vehicle when the second estimate of the understeer coefficient of the vehicle is greater than or equal to a threshold; and
stop controlling the actuator of the vehicle to adjust the lateral position of the vehicle when the second estimate of the understeer coefficient of the vehicle is less than the threshold.

13. The system of claim 1 wherein when the second estimate of the understeer coefficient of the vehicle is less than a threshold, the vehicle actuator control module is configured to:
determine a critical speed of the vehicle based on the second estimate of the understeer coefficient of the vehicle; and
maintain an actual speed of the vehicle at a value that is less than the critical speed.

14. The system of claim 1 wherein
the first estimate is of the understeer coefficient of the vehicle and the trailer;
the second estimate is of the understeer coefficient of the vehicle and the trailer;
the third estimate is of the understeer coefficient of the vehicle and the trailer; and
the vehicle parameter estimation module is configured to update at least one of the second estimate and the third estimate when lateral force excitation is greater than a threshold and vehicle operating conditions are steady-state.

15. A system comprising:
a vehicle parameter estimation module configured to generate, based on a sum of a mass of a vehicle and a mass of a trailer towed by the vehicle, an estimate of an understeer coefficient of the vehicle;
a vehicle state prediction module configured to predict, based on the estimate of the understeer coefficient of the vehicle, a vehicle state at a future time using a vehicle dynamics model, wherein:
the vehicle state includes at least one of a yaw rate of the vehicle and a lateral velocity of the vehicle; and
the vehicle parameter estimation module is configured to determine, based on measured operating conditions of the vehicle, a model error of the vehicle dynamics model; and
a vehicle actuator control module configured to control, based on the vehicle state and the model error, an actuator of the vehicle.

16. The system of claim 15 wherein:
the vehicle parameter estimation module is configured to adjust the estimate to an adjusted estimate, based on the model error; and
the vehicle state prediction module is configured to predict the vehicle state based on one of the estimate and the adjusted estimate.

17. The system of claim 16 wherein the vehicle state prediction module is configured to select the one of the estimate and the adjusted estimates based on the model error associated with the estimate and the adjusted estimates.

18. The system of claim 15 wherein:
the estimate is of the understeer coefficient of the vehicle and a tire cornering stiffness of the vehicle; and
the vehicle state includes both the yaw rate of the vehicle and the lateral velocity of the vehicle.

19. The system of claim 15 wherein:
the vehicle state includes the yaw rate of the vehicle.

20. A method comprising:
determining, based on operating conditions of a vehicle measured or estimated at a first time using a vehicle dynamics model, a first estimate of an understeer coefficient of the vehicle;
determining, based on (a) the first estimate and (b) values of the vehicle operating conditions measured or estimated at a second time that is later than the first time, an error in the vehicle dynamics model;

determining, based on the first estimate and the error, a second estimate of the understeer coefficient of the vehicle;

determining, based on a sum of a mass of the vehicle and a mass of a trailer towed by the vehicle, a third estimate of the understeer coefficient of the vehicle; and controlling, based on one of the second estimate and the third estimate, an actuator of the vehicle to adjust a lateral position of the vehicle.

* * * * *